March 15, 1966 R. L. PIERCE 3,240,509
BALL JOINT STABILIZING ATTACHMENT FOR VEHICLES
Original Filed May 1, 1961
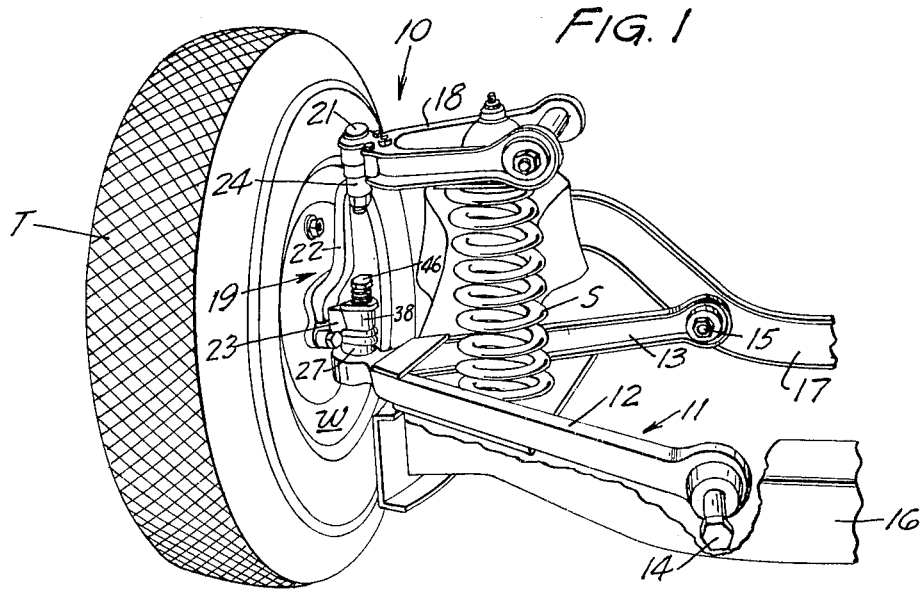
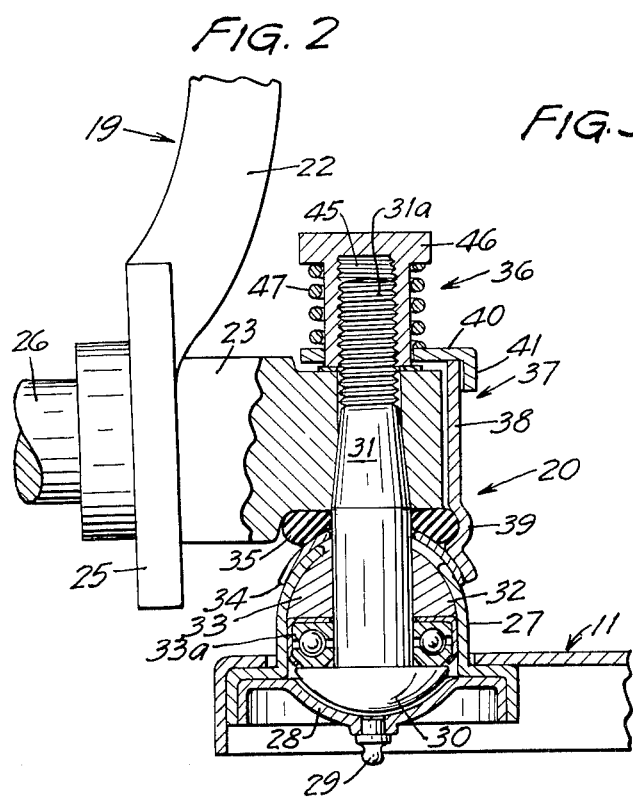
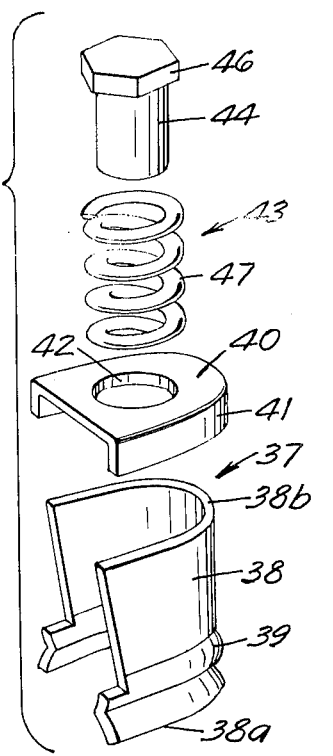
INVENTOR
Raymond L. Pierce
BY Williamson + Palmatier
ATTORNEYS United States Patent Office 3,240,509
Patented Mar. 15, 1966

3,240,509
BALL JOINT STABILIZING ATTACHMENT
FOR VEHICLES
Raymond L. Pierce, 2324 Bartleet Blvd.,
Mound, Minn.
Original application May 1, 1961, Ser. No. 106,981, now
Patent No. 3,104,117, dated Sept. 17, 1963. Divided
and this application Aug. 5, 1963, Ser. No. 299,733
4 Claims. (Cl. 280—96.1)

This invention, which is a divisional application, of Serial No. 106,981, filed May 1, 1961, now Patent No. 3,104,117 relates to stabilizing attachments for use in stabilizing the front end ball joint suspensions of automotive vehicles.

Various makes of automotive vihicles employ ball joint type front end suspensions. In front end suspensions of this type a ball and socket joint interconnects the upper and lower suspension arms with the front wheel spindle assembly. If the snug fitting relation of the ball within the socket is impaired as a result of wear or the like, the ball will become somewhat loosely disposed within the socket. Loose ball joints in front end suspensions not only create annoying noises but this condition also results in improper steering. The wobbly movement of the front tires creates a condition known as "road wandering" as well as causing uneven wear of the front tires of the automobile.

My invention is directed towards overcoming these problems.

It is, therefore, a general object of this invention to provide a novel stabilizing attachment, of simple and inexpensive construction, for use in stabilizing the front end ball joint suspensions of automotive vehicles.

Another object of this invention is to provide a novel and improved stabilizing attachment for use with ball joint front end suspensions of automotive vehicles and including means for exerting tension on the ball joint to thereby constantly urge the ball and socket thereof into snug fitting relation.

A more specific object of this invention is to provide a novel and improved stabilizing attachment for use in applying tension to the lower ball joint of the ball joint front end suspension for automotive vehicles, the attachment being readily attachable to the front end suspensions for detachment therefrom without necessitating extensive alteration of the vehicle.

Another object of this invention is the provision of a novel and improved stabilizing attachment which serves to constantly apply tension to the lower ball joint of front end suspensions of automotive vehicles and the like, and which thereby serves to eliminate steering problems, tire wear and annoying noises attributable to loose ball joints.

These and other objects and adavntages of my invention will more fully appear from the following description made in connection with the accompanying drawings, wherein like character references refer to the same or similar parts throughout the several views, and in which:

FIG. 1 is a front perspective view of a ball joint type suspension of automotive vehicles incorporating one embodiment of my invention;

FIG. 2 is a vereical section on an enlarged scale of the embodiment of my invention as shown in FIG. 1;

FIG. 3 is an exploded perspective view of the stabilizer attachment illustrating the details thereof.

Referring now to the drawings and more specifically to FIGS. 1 and 3, it will be seen that one embodiment of my invention is illustrated in cooperating relation for the purpose of stabilizing a conventional front end suspension of an automotive vehicle, the front end suspension being designated in general by the reference numeral 10. The front end suspension 10 includes a lower control arm or frame 11 of general A-shaped configuration and which includes a front frame element 12 and a rear frame element 13 rigidly interconnected. The front frame element is pivotally connected by means of conventional pivot bolts 14 to the frame member 16 and a rear frame element 13 is pivotally connected to the car frame member 17 by means of a pivot bolt 15 to permit relative pivoting movement between the relative control arm and the automobile frame.

The front end suspension 10 also includes an upper control arm 18 also pivotally connected to the automobile frame (not shown), the upper control arm being spaced substantially above the lower control arm 11. Referring again to FIG. 1, it will be noted that the lower control arm 11 and upper control arm 18 are interconnected to the front wheel spindle assembly 19 by means of lower ball joint 20 and upper ball joint 21, respectively. A heavy coil spirng S extends between the upper and lower control arms respectively and cooperates with the control arms and the front wheel spindle assembly 19 to define the conventional parallelogram suspension for the front end of the automotive vehicle.

The front wheel spindle assembly 19 includes a vertically disposed support member 22 having a laterally extending lower attachment portion or arm 23 and an upper attachment portion or arm 24, the arms being vertically spaced-apart and being disposed in substantially parallel relation. The wheel spindle assembly 19 also includes a plate 25 having the wheel shaft or spindle 26 projecting laterally therefrom to permit a wheel W to be journaled thereon, the wheel W being provided with the conventional pneumatic tire T.

The lower ball joint 20, as best seen in FIG. 2, includes a ball and socket connection, the socket being comprised of a socket portion 27 rigidly attached to the lower control arm 11 and also is comprised of a cup-shaped sealing member 28 rigidly attached to the upper socket portion 27. It will be noted that the cup-shaped sealing member 28 is provided with a depending fitting 29 to facilitate lubrication of the hollow interior defined by the seal member and socket portion, the interior suitably receiving a conventional ball structure 32 which is held against the socket 27 by means of bolt 30 having a tapered vertically extending shank 31 extending upwardly therefrom and through a suitable aperture formed in the lower attachment arm 23 of the wheel spindle assembly 19.

Ball structure 32 includes a semi-spherical upper ball portion 33 and an annular lower ball portion 33a, the latter being a ball bearing. The ball structures are positioned within the interior of the socket and are disposed in bearing engagement with the socket portion 27 by the bolt 30. The socket portion 27 is provided with an outer dome-shaped element or shim 34.

It will be noted that the upper terminal portion of the shank 31 is threaded as at 31a and an annular compressible element 35 is interposed between the lower attachment arm 23 of the wheel spindle assembly 19 and the upper exterior of the upper socket portion 27 which prevents excessive wear of metal against metal and which serves to seal the interior of the socket of the ball joint.

Ordinarily the ball joint is secured in interconnecting relation with respect to the lower control arm and the front wheel spindle assembly by means of lock nut which threadedly engages the upper terminal portion of the shank 31. However, as pointed out above this ball joint not only creates hazardous conditions but also necessitates repeated placement of the worn ball joints. In order to overcome these problems, I have provided a novel stabilizing attachment designated generally by the reference numeral 36 and which includes a ball-joint engaging mechanism 37 which engages the upper exterior surface of the upper socket portion 27 and extends upwardly therefrom. This ball-engaging mechanism 37 includes a generally vertically disposed ball joint engaging member 38 of substantially channel-shaped configuration. It will be noted that the channel-shaped member 38 terminates at its lower end in an arcuate lower peripheral edge 38a which engages an annular surface area of the upper socket portion 27. The channel-shaped member 38 terminates upwardly in an arcuate upper peripheral edge 38b and is provided with an arcuate groove 39 disposed closely adjacent the lower peripheral edge 38a. The channel-shaped configuration of the member 38 permits the member to be positioned around the laterally projecting lower attachment arm 23 of the wheel spindle assembly 19 and also permits effective and uniform bearing engagement of the member against the lower ball joint 20.

The ball-engaging mechanism 37 also includes a substantially flat bearing plate 40 provided with an annular depending flange 41, the plate being provided with a centrally located aperture 42 to permit the passage of the ball shank 31 therethrough. This bearing plate 40 is positioned upon the upper arcuate peripheral edge 38b of the channel-shaped member 38 as best seen in FIG. 2. Means are provided for exerting force downwardly through the ball-engaging mechanism 37 for applying tension to the lower ball joint 20 and this means includes a tensioning mechanism 43 which, as best seen in FIG. 2, includes a tensioning member 44. This tensioning member 44 is provided with a threaded bore 45 which serves to threadedly engage the upper terminal threaded portion 31a of the shank 31. The upper terminal portion of the tensioning member 44 is provided with an annular flange 46 and a resilient element in the form of a coil spring 47 is interposed between the bearing plate 40 and the annular flange 46 so that adjustment of the tensioning member 44 upon the threaded shank 31 permits the spring tension to be readily varied. The spring 47 when compressed by adjustment of the tensioning member 44 imparts tension to the lower ball joint 28 through the ball joint engaging mechanism 37 thus constantly urging the ball and socket of the ball joint into snug fitting relation. Since the ball-joint engaging mechanism 37 is being constantly urged downwardly by action of the spring member 47, the ball and socket joint will be also constantly urged into snug fitting relation, thus my stabilizing attachment actually functions as a self tightening means for ball and socket joints.

It has been found that loose ball joints, that is ball joints wherein wear has resulted in play and looseness between the ball and socket of the ball joint, interferes noticeably with the steering of the automobile since the wheels will not respond as effectively to steering maneuvers. It has also been found that because of the wobbling effect of the wheels with regard to the frame necessitates numerous front wheel alignments and also results in uneven and excessive tire wear. Loose ball joints also create annoying noises and the impact between the loose parts of the ball joint causes more rapid breakdown of the ball joint. It has been found though through the use of my stabilizing attachment that the undesirable results attributable to loose ball joints are greatly precluded if not completely eliminated.

It has also been found that my stabilizing apparatus because of its self tightening function with regard to the ball joint precludes the constant need of replacing or adjusting the ball joint. It will be seen from the drawings and the above description that my novel stabilizing attachment can be readily installed in most automobiles without necessitating extensive alteration to the front end suspensions of the automobiles. It should be pointed out that the particular embodiment illustrated in FIGS. 1 to 3 is especially adaptable to those automobiles in which the frame of the automobile is suspended from the front wheel spindle assembly.

Referring now to FIG. 1, it will be seen that the lower control arm 11 is positioned below and suspended from the front wheel spindle assembly 19 and this arrangement is that which is found in the later model Ford products.

It will therefore be seen from the preceding paragraphs that I have provided a novel stabilizing attachment readily detachable to conventional front end ball joint suspensions for assuring snug fitting relation of the ball and socket element of the conventional lower ball joint of the suspension structure.

It will be noted from the foregoing description that with my unique attachment the problems commonly associated with loose ball joints, to wit, annoying noises, improper steering, undue tire wear and constant replacement of the ball joint are greatly reduced if not eliminated.

Thus, it will be seen from the foregoing description that I have provided a novel stabilizing attachment which while being of simple and inexpensive construction, functions in a more efficient manner than any heretofore known comparable devices.

It will, of course, be understood that various changes may be made in the form, details, arrangement and proportions of the various parts without departing from the scope of my invention.

What is claimed is:

1. Stabilizing attachment for use in stabilizing the front end ball joint suspensions of conventional automotive vehicles having a ball and socket connection between the front wheel spindle assembly and the lower suspension arm in which the ball and socket of the connection are substantially disposed above the suspension arm and below a lower attachment arm of the spindle assembly, said stabilizing attachment comprising a ball-joint engaging mechanism including a vertically disposed channel-shaped member receiving the outer end of the lower attachment arm of the spindle assembly and having a lower peripheral edge adapted to engage the upper surface of said socket and extending upwardly therefrom, and an adjustable tensioning mechanism for exerting tension against said ball-joint engaging mechanism including a threaded tensioning member adapted to threadedly engage the conventional upstanding threaded attachment stud of the lower front end ball joint for shiftable adjustment relative thereto, and a resilient member interposed between said channel member and said tension member and cooperating with the latter for exerting downward tension through said channel-shaped member to the lower front end ball joint to constantly urge the ball and socket thereof into snug fitting relation.

2. The structure as defined in claim 1 wherein said ball joint engaging mechanism includes a bearing plate detachably positioned against the upper portion of said channel-shaped member and bearing against said resilient member.

3. The structure as defined in claim 1 wherein the edge portion of said channel member is of arcuate configuration.

4. A stabilizing attachment for use in stabilizing the front end ball joint suspensions of conventional automotive vehicles having a ball and socket connection between the front wheel spindle assembly and the lower suspension arm in which the ball and socket of the connection are substantially disposed above the suspension arm and below a lower attachment arm of the spindle assembly, said stabilizing attachment comprising a vertically disposed ball-joint engaging member of substantially arcuate channel-shaped cross sectional configuration, receiving the outer end of the lower attachment arm of the spindle assembly, said ball-joint engaging member having a lower peripheral edge engageable with the upper surface of said socket to normally orient the ball-joint engaging member in vertically extending relation therewith, an apertured bearing plate mounted upon the upper peripheral edge of said ball-joint engaging member so that the conventional upstanding threaded attachment stud of the lower front ball end joint extends through the aperture therein, an adjustable threaded tensioning member engageable in threaded relation with the threaded upstanding attachment stud of the lower front end ball joint and being axially adjustable relative thereto, and a coil spring interposed between said bearing plate and said tensioning member and exerting downward tension on the ball-joint engaging member to constantly urge the ball and socket of the lower front end ball joint into snug fitting relation.

References Cited by the Examiner

UNITED STATES PATENTS

| | | |
|---|---|---|
| 2,885,236 | 5/1959 | Carlson _____ 287—87 |
| 2,933,336 | 4/1960 | Pritchard et al. ____ 280—96.1 X |
| 2,999,709 | 9/1961 | Melton et al. |
| 3,030,133 | 4/1962 | Rowlett _____ 280—96.2 X |
| 3,039,787 | 6/1962 | Meyer _____ 280—96.2 |
| 3,055,676 | 9/1962 | McCord _____ 280—96.2 |
| 3,127,192 | 3/1964 | Traugott et al. _____ 280—96.1 |

FOREIGN PATENTS

| | | |
|---|---|---|
| 1,036,377 | 4/1953 | France. |

A. HARRY LEVY, *Primary Examiner.*

KENNETH BETTS, BENJAMIN HERSH, *Examiners.*